United States Patent [19]

Kaelin et al.

[11] 4,234,883
[45] Nov. 18, 1980

[54] NOISE ADAPTIVE CORRELATOR

[75] Inventors: Oscar J. Kaelin, Harvard; Richard H. Mathews, Sudbury, both of Mass.

[73] Assignee: GTE Sylvania Incorporated, Stamford, Conn.

[21] Appl. No.: 509,708

[22] Filed: Sep. 26, 1974

[51] Int. Cl.³ .............................................. H04B 7/00
[52] U.S. Cl. ............................ 343/100 CL; 324/77 G
[58] Field of Search ................ 343/100 CL; 235/181; 324/77 G

[56] References Cited

U.S. PATENT DOCUMENTS

| | | | |
|---|---|---|---|
| 3,045,916 | 7/1962 | Downes | 235/181 |
| 3,337,870 | 8/1967 | Allen et al. | 343/100 CL |
| 3,355,736 | 11/1967 | Perper | 343/100 CL |
| 3,775,770 | 11/1973 | Dillard et al. | 343/100 CL |
| 3,876,947 | 4/1975 | Giraudon | 324/77 G X |

*Primary Examiner*—Theodore M. Plum
*Attorney, Agent, or Firm*—David M. Keay

[57] ABSTRACT

Time-correlation apparatus for collecting correlation data when the noise level is low and inhibiting the collection of correlation data when the noise level is high without losing valid correlation data which has already been obtained. An incoming signal is checked for data pulses during each correlation measurement pulse of a synchronizing signal. The correlation measurement pulses are counted by a first counter, and the coincidences of data pulses and correlation measurement pulses are counted by a second counter. A noise monitor samples the incoming signals 100 times during each of a continuous series of noise analysis periods and counts the number of times the signal (assumed to be noise) exceeds a predetermined threshold. A high noise signal is generated if the threshold is exceeded 30 or more times, and a low noise signal if it is exceeded less than 30 times. A low noise signal at the end of a noise analysis period causes the counts in the first and second counters to be loaded into first and second buffers, respectively. A high noise signal at the end of a noise analysis period causes the counts in the first and second buffers to be loaded into the first and second counters, respectively, in place of the counts therein. Thus, if there is a low noise level during a noise analysis period, correlation data is collected. If there is a high noise level during a noise analysis period, correlation data collected during that period is dumped but previously collected data is retained. When the count of correlation measurement pulses in the first counter reaches 100, the count of coincidences in the second counter is read out as a measure of the degree of correlation between the incoming signal and the synchronizing signal.

7 Claims, 4 Drawing Figures

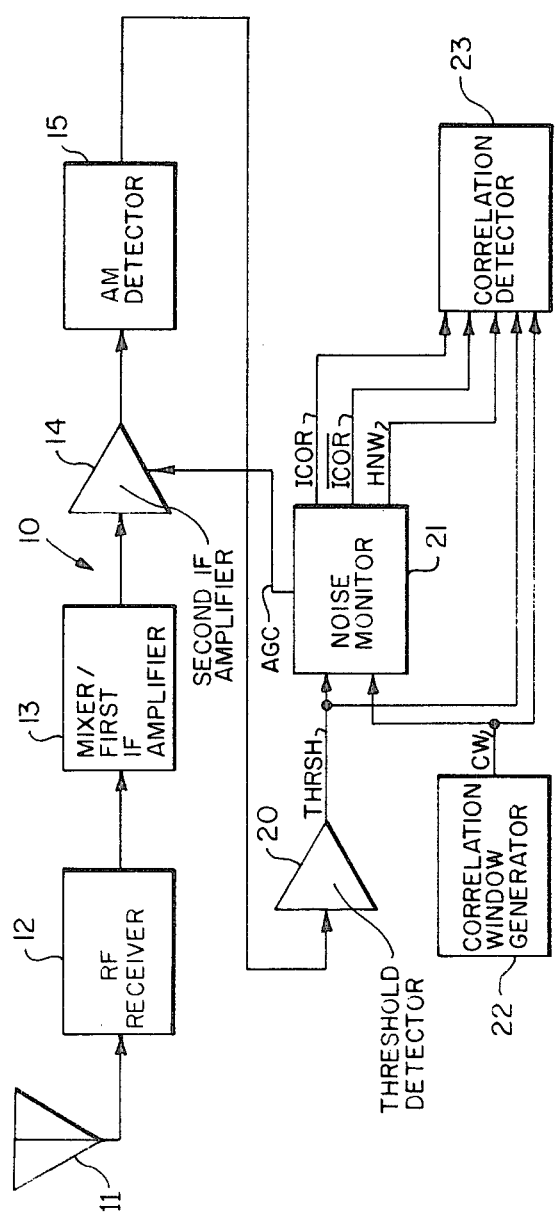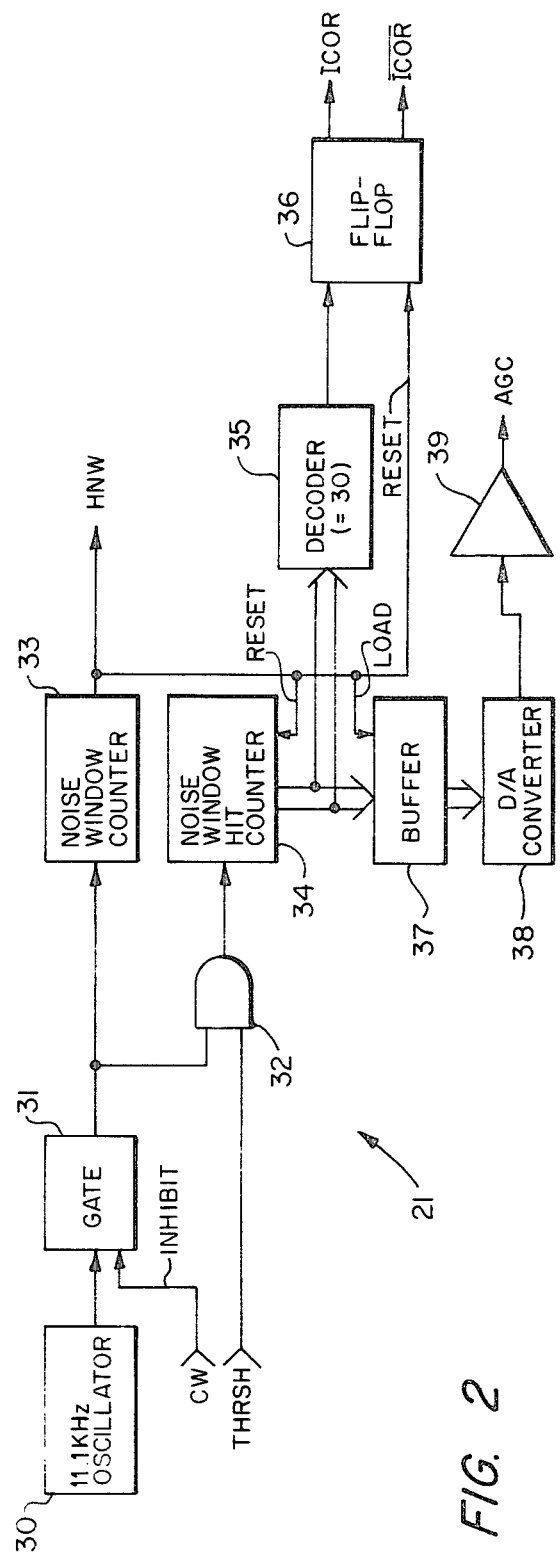
FIG. 1
FIG. 2

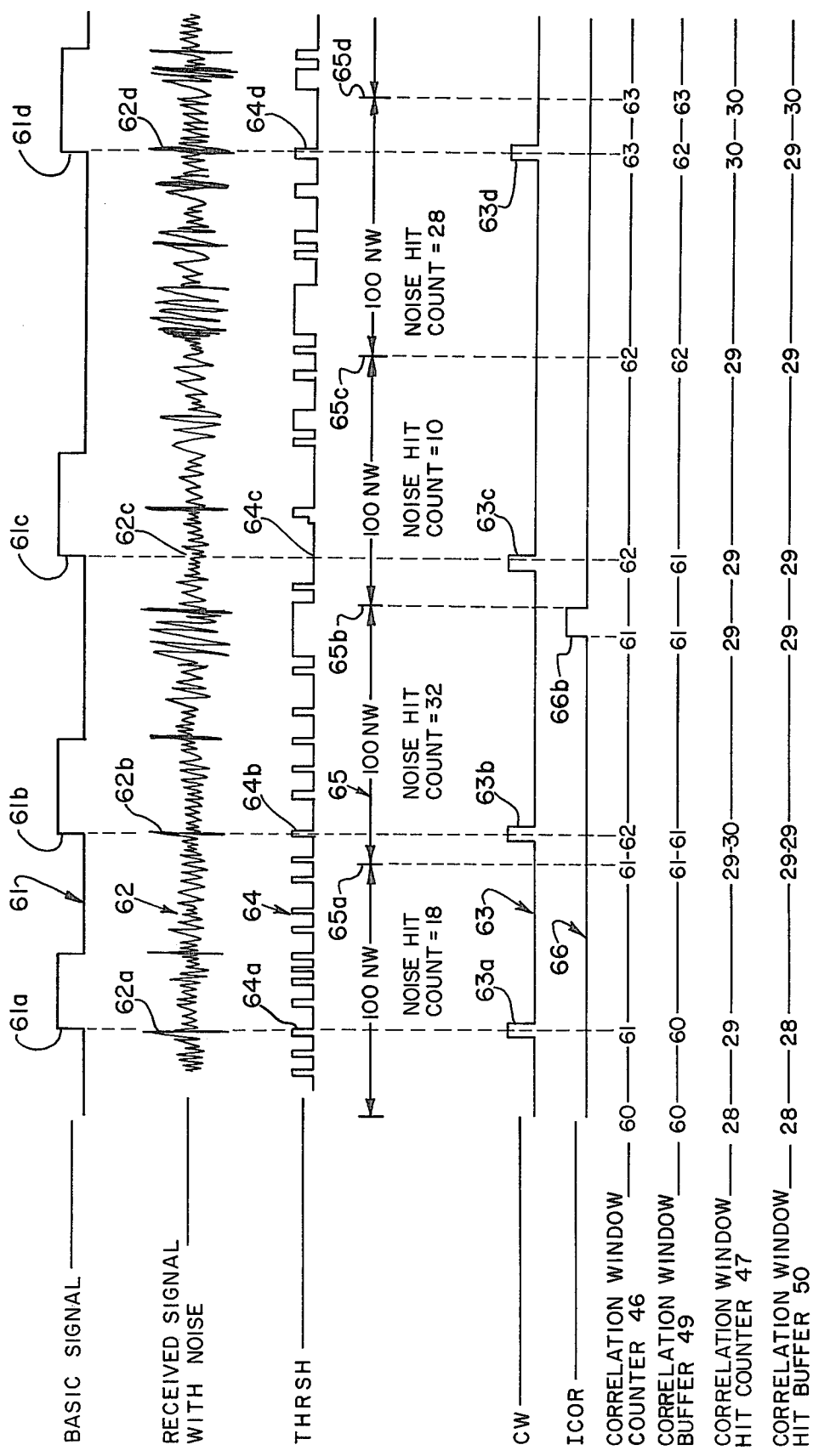

NOISE ADAPTIVE CORRELATOR

BACKGROUND OF THE INVENTION

This invention relates to apparatus for measuring the time-correlation between two signals. More particularly, it is concerned with apparatus for measuring the time-correlation between received impulse signals and synchronizing pulses in the presence of noise.

In certain types of communication systems designed to insure the confidentiality of transmitted messages, received signals are correlated with a synchronizing signal at the receiver to determine if the received signals include valid message data. The synchronizing signal may be obtained in any of various ways and made available at the receiver. The degree of correlation between the received input signal and the synchronizing signal is a measure of the authenticity of the message data being received.

Various techniques and apparatus are known for measuring the degree of correlation between received input signals and a synchronizing signal. Systems have been devised for determining the degree of correlation in the presence of noise which tends to obscure the correlation information in the received input signal. In apparatus heretofore available for measuring correlation in the presence of noise, correlation data for each measurement is collected over a period of time. If an excessive noise level occurs at any time during a period, all correlation data accumulated during the period is dropped. The loss of correlation data is particularly high when the data rate is low in comparison with the rate at which noise measurements are being made.

SUMMARY OF THE INVENTION

Time-correlation apparatus in accordance with the present invention provides for taking correlation data when the noise level is low and inhibiting the taking of correlation data when the noise level is high without losing any valid correlation data which has already been obtained. The apparatus for measuring the degree of correlation between input signals and synchronizing signals in the form of correlation measurement pulses in the presence of input noise includes a correlation pulse generating means which produces a continuous series of correlation measurement pulses. A correlation gating means produces a correlation coincidence pulse in response to the coincidence of an input signal and a correlation measurement pulse. The apparatus includes noise measuring means for determining whether or not input noise exceeds a predetermined noise condition during each of a series of noise analysis periods. The noise measuring means produces a first indication when the input noise does not exceed the predetermined noise condition during a noise analysis period and produces a second indication when the input noise does exceed the predetermined noise condition during a noise analysis period.

A first counting means is coupled to the correlation pulse generating means for counting correlation measurement pulses, and a first count storage means is coupled to the first counting means. A second counting means is coupled to the correlation gating means for counting correlation measurement coincidence pulses, and a second count storage means is coupled to the second counting means. The first and second count storage means are both coupled to the noise measuring means and in response to a first indication therefrom load the counts present in the first and second counting means into the first and second count storage means, respectively. The first and second counting means are coupled to the noise measuring means and in response to a second indication therefrom load the count present in the first and second count storage means into the first and second counting means, respectively. Thus, if the input noise does not exceed the predetermined noise condition during a noise analysis period, correlation data accumulated in the first and second counting means is transferred to the first and second count storage means, respectively. If during a noise analysis period the input noise does exceed the predetermined noise condition, the count stored in the first and second count storage means, which is the correlation data accumulated up to the start of that noise analysis period, is loaded into the first and second counting means, respectively, thus removing any correlation data obtained during that noise analysis period. That is, data obtained during the noise analysis period of excessive noise is removed, and all previously received valid correlation data is retained. The apparatus also includes an indicator means for indicating the relationship of the counts in the first and second counting means, thus providing a measure of the degree of correlation between the input signals and the correlation measurement pulses.

BRIEF DESCRIPTION OF THE DRAWINGS

Additional objects, features, and advantages of correlation apparatus in accordance with the present invention will be apparent from the following detailed discussion together with the accompanying drawings wherein:

FIG. 1 is a block diagram of correlation apparatus in accordance with the present invention employed in conjunction with a radio communication receiver;

FIG. 2 is a block diagram of a noise monitor section of the apparatus of FIG. 1;

FIG. 4 is a diagram illustrating occurrences at various points in the apparatus during an exemplary sequence of events.

DETAILED DESCRIPTION OF THE INVENTION

General

Figure 3:
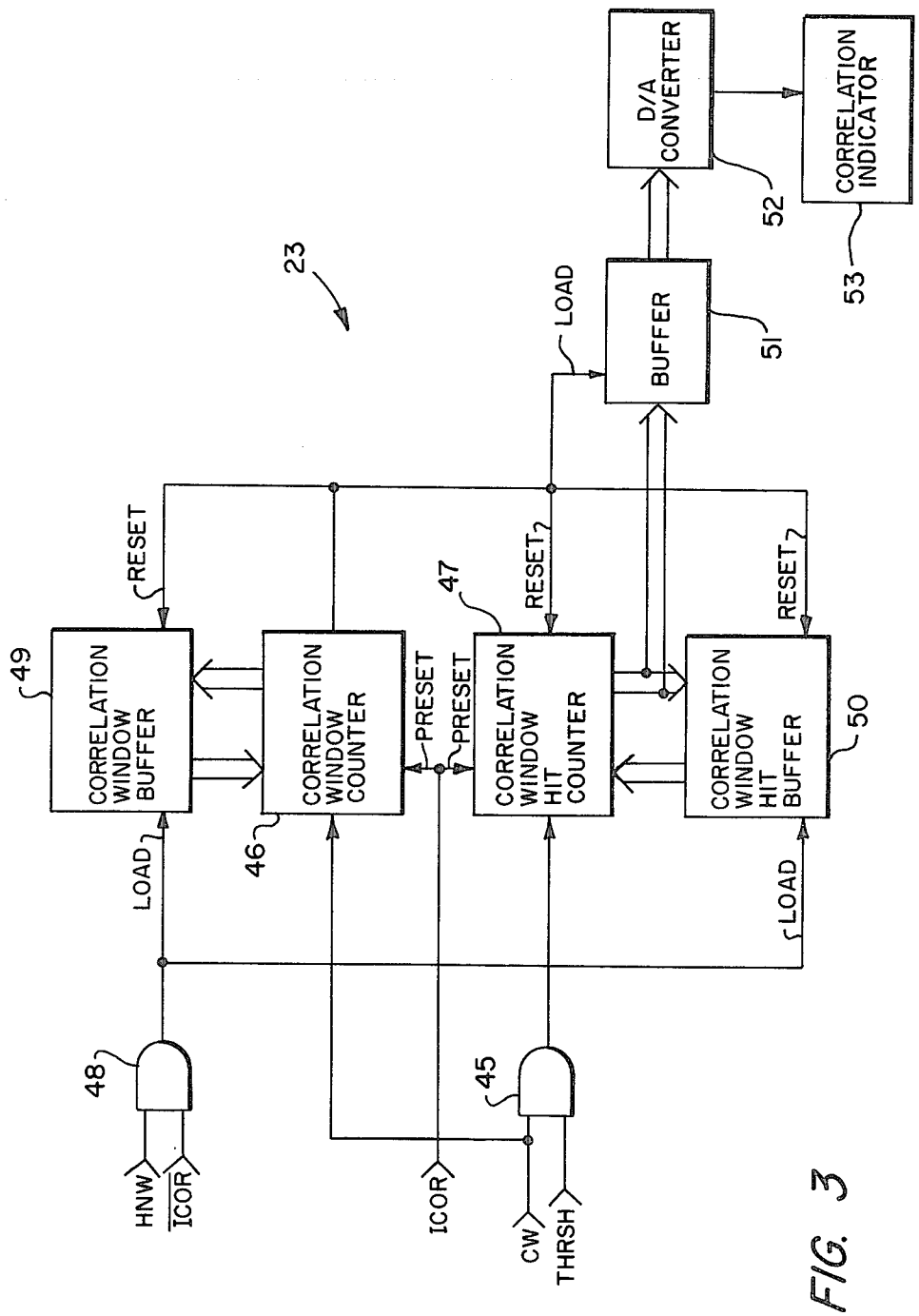
FIG. 3 is a block diagram of a correlation detector of the apparatus of FIG. 1.

FIG. 1 illustrates time-correlation apparatus in accordance with the invention employed with a communication radio receiver 10. Incoming signals are received on an antenna 11, conducted through an RF receiver 12, to a mixer/first IF amplifier 13, to a second IF amplifier 14, and passed to an AM detector 15 from which detected signals are taken in the usual well understood manner. The output of the AM detector 15 is applied to a threshold detector 20 which passes a signal at a fixed level whenever the amplitude at its input exceeds a predetermined level. The output of the threshold detector 20 is labeled THRSH. The THRSH signal is applied to a noise monitor section 21. One of the functions of the noise monitor 21 is to continually monitor the THRSH signal and produce an AGC signal to the second IF amplifier 14 to adjust for the input noise level.

The apparatus as shown in FIG. 1 includes a correlation window generator 22 which produces correlation window, or correlation measurement, pulses CW. These pulses are the synchronizing signal which is compared with the THRSH signal by a correlation detector 23 to determine the degree of correlation therebetween. The correlation window pulses CW from the correlation window generator 22 may be generated under control of any of various techniques depending upon the particular communication system and correlation principles employes. In any event, during the receipt of an incoming signal a series of correlation window pulses CW are generated by the correlation window generator 22.

The THRSH signal from the threshold detector 20 includes incoming signal information together with input noise and is compared with the correlation window pulses CW by the correlation detector 23. The correlation detector 23 detects the presence of a THRSH signal during each correlation window pulse CW. The ratio of the number of THRSH and CW coincidences to the number of CW pulses is a measure of the degree of correlation of the correlation window pulses with the input signal being received. The correlation detector 23 includes an indicator for providing a readout of this measurement.

In addition to the AGC signal, the noise monitor 21 produces signal labeled ICOR, and its inversion $\overline{\text{ICOR}}$, and HNW to control the operation of the correlation detector 23. As will be explained hereinbelow these signals cause the correlation detector to retain correlation data accumulated during noise analysis periods during which input noise conditions do not exceed a certain level and to reject correlation data obtained during noise analysis periods during which input noise conditions exceed the certain level without losing valid correlation data previously accumulated. The noise monitor 21 checks the THRSH signal continuously during each noise analysis period to provide input noise level information to the correlation detector 23 and also to adjust the AGC signal in accordance with the level of the input noise.

Noise Monitor

The noise monitor 21 of the apparatus is illustrated in detail in the block diagram of FIG. 2. The noise monitor 21 includes a squarewave oscillator 30 which, as an example in the specific embodiment under discussion, produces noise window pulses at a rate of 11.1 KHz. The output of the oscillator passes through a gating arrangement 31 which is inhibited during correlation window pulses CW. The output of the gate 31 is combined with the THRSH signal from the threshold detector 20 by an AND gate 32. The AND gate 32 thus produces a noise window hit pulse whenever the threshold detector 20 passes a THRSH signal coincident with a noise window pulse from the oscillator 30.

The noise window pulses from the oscillator 30 which pass through the gate 31 are counted by a noise window counter 33. In the specific embodiment under discussion the noise window counter counts repeatedly from zero to 100 in a recurring sequence. When the count in the counter 33 reaches 100, the counter produces a HNW pulse. A noise window counter 34 counts the number of coincidence or hit pulses produced by the AND gate 32.

The count in the noise window hit counter 34 is applied to a decoder 35 which in the specific embodiment under discussion is arranged to detect a count of 30. The decoder 35 is connected to a flip-flop 36. In its normal reset state flip-flop 36 produces a low level ICOR signal and high level $\overline{\text{ICOR}}$ signal. An output signal from the decoder 35 when the count in the noise window hit counter 34 reaches 30 triggers the flip-flop to its set state and the ICOR signal becomes high and the $\overline{\text{ICOR}}$ signal low.

The count in the noise window hit counter 34 is also applied to a buffer 37. The count in the noise window hit counter 34 is loaded into the buffer 37 in response to a HNW pulse from the noise window counter 33. The contents of the buffer 37 is applied to a digital-to-analog converter 38 which produces an analog signal proportional to the count in the buffer. The output of the digital-to-analog converter 38 is applied to an amplifier 39 to produce an AGC signal which, as illustrated in FIG. 1, is applied to the second IF amplifier 14. The AGC signal adjusts the gain of the system and thus the level of the received signal and noise which passes through the threshold detector 20.

The counting of 100 noise window pulses by the noise window counter 33 determines a noise analysis period. The HNW pulse from the counter 33 when the counter reaches 100 is employed to reset the noise window hit counter 34 to zero and the flip-flop 36 to its reset state, after loading the count in the noise window hit counter 34 into the buffer 37.

Thus, at the start of each noise analysis period the flip-flop 36 produces an $\overline{\text{ICOR}}$ signal. If the count in the noise window hit counter 34 does not reach 30 during a noise analysis period of 100 noise window pulses, the $\overline{\text{ICOR}}$ signal is produced throughout the entire period. If the noise window hit count reaches 30, the flip-flop 36 is triggered producing the ICOR signal and terminating the $\overline{\text{ICOR}}$ signal. The ICOR signal is not terminated until the end of the noise analysis period when the flip-flop 36 is reset in response to an HNW pulse from the noise window counter 33.

In addition, at the end of the noise analysis period the count in the noise window hit counter 34 is transferred to the buffer 37 and converted to an analog voltage by the digital-to-analog converter 38 to provide an AGC signal to the second IF amplifier 14. In the specific embodiment under discussion it has been found desirable that an average of 15 noise window hits be recorded during a noise analysis period. This level insures that the gain is sufficient to detect weak incoming signals but not so great as to cause excessive false alarms by virtue of too much noise being passed by the threshold detector 20.

The gate 31 passes noise window pulses from the oscillator 30 except when it is inhibited by a correlation window pulse CW. Since the threshold detector 20 should be passing a THRSH signal during each correlation window pulse, the noise window hit counter 34 would incorrectly count the THRSH signal as noise if the noise measurement procedure were not discontinued at that time.

Correlation Detector

The correlation detector section 23 of the apparatus is illustrated in detail in the block diagram of FIG. 3. The degree of correlation between the THRSH signal from the threshold detector 20 and the correlation window pulses CW is measured by the correlation detector 23 under control of the ICOR, $\overline{\text{ICOR}}$, and HNW signals from the noise monitor 21.

The THRSH signal and the correlation window pulses CW are applied to an AND gate 45. Thus, the AND gate 45 produces a correlation window coincidence, or hit, pulse if a THRSH signal exists during a CW pulse. The correlation window pulse CW is also applied to a correlation window counter 46 which counts repeatedly from zero to 100 in a recurring sequence. The output of the AND gate 45 is applied to a correlation window hit counter 47. The correlation window counter 46 counts correlation window pulses CW and produces an output signal when the count reaches 100, and the correlation window hit counter 47 counts hit pulses produced on coincidence of a CW pulse and THRSH signal.

The HNW and $\overline{\text{ICOR}}$ signals from the noise monitor 21 are applied to an AND gate 48. The AND gate 48 produces an output pulse upon the coincidence of these two signals. This coincidence occurs at the end of a noise analysis period if the count in the noise hit counter 34 is less than 30 at the end of the noise analysis period. A pulse from the AND gate 48 is applied to a correlation window buffer 49 and a correlation window hit buffer 50 as a LOAD signal. The correlation window counter 46 and correlation window buffer 49 are arranged with their outputs and inputs cross-connected. Similarly, the correlation window hit counter 47 and the correlation window hit buffer 50 have their inputs and outputs cross-connected. Thus, a LOAD pulse from the AND gate 48 causes the counts in the correlation window hit counter 46 and the correlation window hit counter 47 to be loaded into the correlation window buffer 49 and the correlation window hit buffer 50, respectively.

The correlation window counter 46 and correlation window hit counter 47 are presettable counters, and the ICOR signal from the noise monitor 21 is applied to their preset terminals. Thus, an ICOR signal causes the correlation window counter 46 and the correlation window hit counter 47 to be set to the counts in the correlation window buffer 49 and correlation window hit buffer 50, respectively. As explained previously, an ICOR signal is produced by the noise monitor when the number of noise window hits during a noise analysis period reaches 30.

The input of a buffer 51 is connected to the output of the correlation window hit counter 47. The buffer 51 is also connected to the correlation window counter 46 so that when the count in the correlation window counter 46 reaches 100, its output signal loads the count in the correlation window hit counter 47 into the buffer 51. The output of the buffer 51 is connected to a digital-to-analog converter 52 which converts the digital count in the buffer 51 to an analog voltage. The analog voltage is applied to a correlation indicator 53 which may be any of various types of instruments providing a read-out relative to the applied voltage thus indicating the degree of correlation.

The output signal of the correlation window counter 46 when it reaches a count of 100 loads the contents of the correlation window hit counter 47 into the buffer 51 as explained. In addition, in response to this output signal the correlation window hit counter 47, the correlation window buffer 49, and the correlation window hit buffer 50 are reset to zero in preparation for accumulating data for the next correlation measurement.

Operation

Operation of the apparatus shown in FIGS. 1, 2, and 3 more readily may be understood by a discussion of an exemplary sequence of events such as illustrated in the diagram of FIG. 4. Voltage curve 61 may be considered an example of a basic signal containing only message information as originally produced. The message information is provided as a time dependent bit pattern (+ and − levels). Typically, the bit rate may vary from 75 to 9,600 per second. The actual detected received signal together with noise is represented by the voltage curve 62. The transitions on the leading and trailing edges of pulses in signal 61 may appear as voltage swings in the received signal 62. The other voltage excursions in the signal 62 may be considered as noise.

The validity of the received signal 62 is determined by measuring the degree of correlation between the received signal and a synchronizing signal of correlation measurement or window pulses CW 63. In this particular example a CW pulse 63 occurs in time-coincidence with each positive-going leading edge of the basic signal 61. In order to determine the degree of correlation between the received signal 62 and the correlation window pulses CW, the received signal 62 is checked during each CW pulse to determine whether or not a voltage pulse is present in the received signal at that instant. The ratio of the coincidence of CW pulses 63 and voltage pulses in received signal 62 to the CW pulses 63 is a measure of the degree of correlation. Typically, the width of the CW pulses may be from 10 to 50 miscroseconds depending on the bandwidth of the received signal.

The threshold detector 20 converts the received signal 62, including noise, to a THRSH signal such as shown in the voltage curve 64. The various signal curves are shown divided into noise analysis periods of 100 noise window pulses each as indicated at 65. FIG. 4 also includes a table showing the counts in the correlation window counter 46, the correlation window buffer 49, the correlation window hit counter 47, and the correlation window hit buffer 50 at the points during the sequence that there is a change in the contents of a counter or buffer.

It is assumed that at the start of the sequence illustrated a correlation measurement has proceeded to a point such that counters and buffers contain the counts as indicated. During the first correlation window pulse 63a illustrated in FIG. 4 the THRSH signal 64a is high causing the correlation window hit counter 47 to change from a count of 28 to 29. The correlation window counter 46 changes from a count of 60 to 61. By the end of the noise analysis period of 100 noise window pulses as indicated at 65a, the count in the noise window hit counter 34 is 18 as stated in FIG. 4. Thus, the flip-flop 36 is producing the $\overline{\text{ICOR}}$ signal. The combination of the $\overline{\text{ICOR}}$ signal and the HNW pulse 65a causes the AND gate 48 to produce a LOAD pulse loading the contents of the correlation window counter 46 and the correlation window hit counter 47 into the correlation window buffer 49 and correlation window hit buffer 50, respectively. The count in the correlation window buffer 49 changes from 60 to 61 and the count in the correlation window hit buffer 50 changes from 28 to 29.

During the next correlation window pulses CW 63b the THRSH signal 64b is high. AND gate 45 produces a pulse so that the counts in the correlation window counter 46 and the correlation window hit counter 47 are advanced to 62 and 30, respectively. However, during this noise analysis period of 100 noise measurement pulses the count in the noise window hit counter 34 reaches 30 (the final count being 32). When the count goes to 30, the decoder 35 triggers the flip-flop 36 to produce the ICOR signal 66b and terminate the $\overline{\text{ICOR}}$ signal.

The ICOR signal is applied to the preset connections of the correlation window counter 46 and the correlation window hit counter 47 causing them to be set to the counts in the correlation window buffer 49 and correlation window hit buffer 50, respectively. Thus, the correlation window counter 46 is set back to a count of 61 and the correlation window hit counter 47 is set back to a count of 29, the same counts that were present therein and also in their associated buffers at the start of the noise analysis period. Since there is no ICOR signal at the time of the HNW pulse 65b at the end of the noise analysis period, no LOAD signal is produced by AND gate 48 to the buffers 49 and 50. Therefore, the correlaton data received during the noise analysis period, whether actually valid or not, is considered to be invalid because of the excessive noise level and is removed. However, all the preceding correlation data which has been accumulated in the buffers 49 and 50 is retained and employed to reestablish the valid data in the counters 46 and 47.

On the next correlation window pulse CW 63c the level of the THRSH signal 64c is low. The CW pulse 63c causes the count in the correlation window counter 46 to change from 61 to 62. Since the THRSH signal is low, there is no pulse from AND gate 45 and the count in the correlation window hit counter 47 remains at 29. At the end of the noise analysis period, during which the noise hit count reaches 10, the $\overline{ICOR}$ signal is present and together with the HNW pulse 65c causes AND gate 48 to produce a LOAD pulse. The LOAD pulse enters the contents of the counters 46 and 47 into the buffers 49 and 50, respectively. Thus, a count of 62 is placed in the correlation window hit buffer 49 while the count in the correlation window hit buffer 50 remains at 29.

During the next noise analysis period another CW pulse 63d coincides with a high THRSH signal 64d. The counts in the correlation window counter 46 and the correlation window hit counter 47 advance to 63 and 30, respectively. Since the noise hit count to the end of the noise analysis period 65d remains less than 30, the $\overline{ICOR}$ signal is present during the HNW pulse 65d. Thus, a load pulse is produced by the AND gate 48 loading the counts in the counters 46 and 47 into the buffers 49 and 50, respectively.

Operation of the apparatus continues in this way until the count in the correlation window counter 46 reaches 100 completing a correlation measurement. As explained previously, a signal from the correlation window counter 46 then causes the buffer 51 to be loaded with the count in the correlation window hit counter 47. The digital count in the buffer 51 is converted to an analog voltage by the digital-to-analog converter 52 which operates a correlation indicator 53 of any suitable type for providing a readout in a desired format. In addition, as explained previously, when the correlation window counter 46 completes the count of 100 and returns to its initial count of zero, the correlation window buffer 49, the correlation window hit counter 47, and the correlation window hit buffer 50 are reset to zero in preparation for the next correlation measurement.

Thus, time-correlation apparatus in accordance with the present invention provides for measuring the correlation between an incoming signal and correlation measurement or synchronizing pulses. The apparatus as described permits the obtaining of correlation data despite the presence of noise. Although correlation data collected during a noise analysis period in which the noise level is excessively high is disregarded, previous data is not lost. That is, previously collected data for use in making a measurement is retained and employed together with data obtained during subsequent noise analysis periods of low noise until sufficient correlation data is accumulated to provide a correlation measurement.

While there has been shown and described what is considered a preferred embodiment of the present invention, it will be obvious to those skilled in the art that various changes and modifications may be made therein without departing from the invention as defined by the appended claims.

What is claimed is:

1. Apparatus for measuring the degree of correlation between input signals and correlation measurement pulses in the presence of input noise including
    correlation pulse generating means for producing a continuous series of correlation measurement pulses;
    correlation gating means for producing a correlation measurement coincidence pulse in response to the coincidence of an input signal and a correlation measurement pulse;
    noise measuring means for determining whether or not input noise exceeds a predetermined noise condition during each of a series of noise analysis periods, said noise measuring means being operable to produce a first indication when the input noise does not exceed the predetermined noise condition during a noise analysis period and being operable to produce a second indication when the input noise exceeds the predetermined noise condition during a noise analysis period;
    first counting means coupled to said correlation pulse generating means for counting correlation measurement pulses;
    first count storage means coupled to said first counting means;
    second counting means coupled to said correlation gating means for counting correlation measurement coincidence pulses;
    second count storage means coupled to said second counting means;
    said first and second count storage means being coupled to said noise measuring means and being operable in response to a first indication therefrom to load the counts present in the first and second counting means into the first and second count storage means, respectively;
    said first and second counting means being coupled to said noise measuring means and being operable in response to a second indication therefrom to load the counts present in the first and second count storage means into the first and second counting means, respectively; and
    indicator means for indicating the relationship of the counts in the first and second counting means.

2. Apparatus in accordance with claim 1 wherein
    said noise measuring means includes means for providing a signal at the end of each noise analysis period;
    and including
        gating means coupled between said noise measuring means and said first and second count storage means for causing the counts present in the first and second counting means to be loaded into the first and second count storage means, respectively, in response to said signal at the end of a noise analysis period and the occurrence of a first indication.

3. Apparatus in accordance with claim 2 wherein
said first counting means repeatedly counts through a recurring sequence;
said first counting means is coupled to said second counting means, said first and second count storage means, and said indicator means;
said second counting means and said first and second count storage means being operable to be reset to an initial state in response to the end of each counting sequence of said first counting means; and
said indicator means being operable to read out the count in the second counting means at the end of each counting sequence of said first counting means.

4. Apparatus in accordance with claim 3 wherein
said noise measuring means includes
noise pulse generating means for producing periodic noise measurement pulses;
noise gating means for producing a noise measurement coincidence pulse in response to the coincidence of input noise in excess of a particular level and a noise measurement pulse;
first noise counting means coupled to said noise pulse generating means for repeatedly counting noise measurement pulses through a recurring sequence, each sequence being a noise analysis period;
second noise counting means coupled to said noise gating means for counting noise measurement coincidence pulses; and
bistable means coupled to said second noise counting means and operable to produce said first indication when the count in said second noise counting means is less than a predetermined value and to produce said second indication when the count in said second noise counting means is equal to or greater than said predetermined value.

5. Apparatus in accordance with claim 4 wherein
said bistable means has a first operating state during which it produces said first indication and a second operating state during which it produces said second indication;
said first noise counting means is coupled to said second noise counting means and to said bistable means;
said second noise counting means being operable to be reset to an initial state in response to the end of a counting sequence of said first noise counting means; and
said bistable means being operable to be switched from the first operating state to the second operating state when the count in the second noise counting means reaches said predetermined value and being operable to be switched from the second operating state to the first operating state at the end of a counting sequence of said first noise counting means.

6. Apparatus in accordance with claim 5 including
an input connection for conducting the input signal and input noise;
threshold means connected to the input connection for passing input signal plus input noise greater than a predetermined level and blocking input signal plus input noise less than said predetermined level;
said threshold means being coupled to said correlation gating means and said noise gating means.

7. Apparatus in accordance with claim 6 including
gating means coupled between said noise pulse generating means and said first and second noise counting means, said gating means being coupled to said correlation pulse generating means and being operable to prevent the passage of pulses to said first and second noise counting means during correlation measurement pulses.

* * * * *